United States Patent [19]

Kurakake et al.

[11] Patent Number: 4,829,454
[45] Date of Patent: May 9, 1989

[54] PICTURE PROCESSING APPARATUS

[75] Inventors: Mitsuo Kurakake; Shoichi Otsuka, both of Hino, Japan

[73] Assignee: Fanuc Ltd, Minamitsuru, Japan

[21] Appl. No.: 46,919

[22] PCT Filed: Aug. 7, 1986

[86] PCT No.: PCT/JP86/00405
§ 371 Date: Apr. 3, 1987
§ 102(e) Date: Apr. 3, 1987

[87] PCT Pub. No.: WO87/00944
PCT Pub. Date: Feb. 12, 1987

[30] Foreign Application Priority Data

Aug. 8, 1985 [JP] Japan ............................. 60-174739

[51] Int. Cl.$^4$ ............................................. G06F 15/66
[52] U.S. Cl. .................................... 364/521; 364/518; 340/721; 340/723; 340/747; 382/48; 382/56; 382/46
[58] Field of Search ................... 364/521, 414, 518; 340/721, 723, 747; 358/101, 106, 107, 111; 382/8, 16, 48, 56, 45, 46

[56] References Cited

U.S. PATENT DOCUMENTS

| | | | |
|---|---|---|---|
| 4,400,728 | 8/1983 | Long | 358/107 |
| 4,450,579 | 5/1984 | Nakashima et al. | 382/8 |
| 4,479,145 | 10/1984 | Azuma et al. | 358/106 |
| 4,589,139 | 5/1986 | Hada et al. | 382/8 |
| 4,651,341 | 3/1987 | Nakashima et al. | 382/34 |
| 4,700,224 | 10/1987 | Miyasaka et al. | 358/101 |
| 4,707,647 | 11/1987 | Coldren et al. | 318/568 |

FOREIGN PATENT DOCUMENTS 124946 10/1978 Japan .
148233 12/1978 Japan .
27084 2/1985 Japan .

Primary Examiner—Gary V. Harkcom
Assistant Examiner—Randy W. Lacasse
Attorney, Agent, or Firm—Staas & Halsey

[57] ABSTRACT

A picture processing apparatus includes a window memory (6) connected to a CRT controller (6) and having a size corresponding to a frame memory (2) storing a picture to be processed. A bit pattern for specifying the validity or invalidity of processing performed by a processor (1) is stored in the window memory (6), and picture processing is performed only with regard to picture data of the bits indicative of validity.

2 Claims, 1 Drawing Sheet

PICTURE PROCESSING APPARATUS

CROSS REFERENCE TO RELATED APPLICATION

This application is related to copending application Ser. No. 52,049, filed Apr. 10, 1987, and assigned to the assignee of the subject application.

BACKGROUND OF THE INVENTION

1. Technical Field

This invention relates to an apparatus for processing a picture displayed on a display device such as a CRT display. More particularly, the invention relates to a picture processing apparatus so adapted that picture processing for feature recognition of an object in the picture can be limited by a window pattern.

2. Background Art

The state of an operation performed by an industrial robot or the like can be photographed by a video camera and displayed on a display device. In a conventional picture processing apparatus, the picture from the video camera is stored in a buffer memory such as a frame memory having a storage area corresponding to the display frame, and discrimination of the position of an object contained in the picture data and recognition of the shape of the object are realized by executing predetermined picture processing with regard to all information in the frame memory.

With the conventional picture processing apparatus of this type, there are cases where the desired results can be obtained without performing processing with regard to all picture data in the frame memory. However, in a case where picture processing is executed by a picture processor for picture data stored in a frame memory, picture processing based on all data in the designated frame memory is unavoidable since the processor does not have an area limiting function. Consequently, complicated data processing such as filtering processing is accompanied by an increase in working memory capacity or prolonged processing time, thus making efficient picture processing impossible.

SUMMARY OF THE INVENTION

The present invention has been devised in order to solve the aforementioned problem and its object is to provide a picture processing apparatus in which the validity or invalidity of processing is designated for every pixel of picture information by using a window memory having a size corresponding to a frame memory, whereby highly efficient picture processing can be realized.

According to the present invention, there is provided a picture processing apparatus for displaying on a display device a picture obtained from a sensor, the apparatus including a processor for performing picture processing, a frame memory for storing a picture to be processed, a window memory of a size corresponding to the frame memory for storing a bit pattern for designating the validity or invalidity of processing performed by the processor, and a control circuit for writing picture data into the frame memory, for reading out of the frame memory picture data of a bit pattern indicative of validity, and for displaying the picture data on the display device.

In the picture processing apparatus according to the present invention constructed as set forth above, a bit pattern specifying the validity or invalidity of process- ing performed by the processor is stored in the window memory in a size corresponding to the frame memory, so that picture processing can be executed while reference is made to the effective bits. Accordingly, processing speed can be raised and a memory of large capacity is unnecessary even for complicated data processing such as filtering processing. This makes it possible to perform highly efficient picture processing.

DESCRIPTION OF THE PREFERRED EMBODIMENT

An embodiment of the invention will now be described with reference to the drawings.

Figure 1:
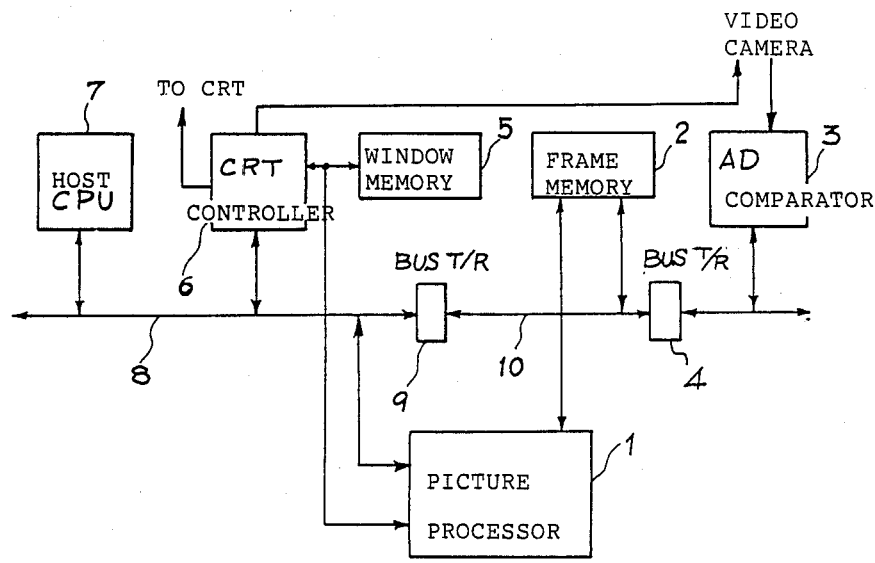
FIG. 1 is a block diagram of an embodiment of a picture processing apparatus according to the present invention.
Figure 2:
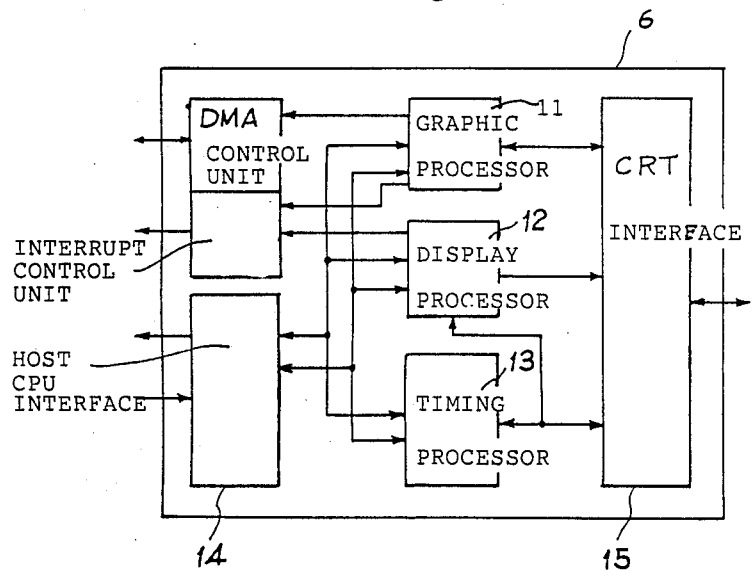
FIG. 2 is a block diagram of one example of the CRT controller 6 used in the picture processing apparatus of FIG. 1.

FIG. 1 is a block diagram of a picture processing apparatus according to the invention, and FIG. 2 is a block diagram for describing an example of the internal construction of a CRT controller used in the picture processing apparatus of the invention.

In FIG. 1, numeral 1 denotes a processor for performing picture processing. The processor is connected to a frame memory 2, a plurality of which are provided for storing picture data two-dimensionally as plural horizontal and vertical pixel data. Numeral 3 denotes an AD converter for converting an analog picture from a video camera into a digital signal, and for writing the digital signal into the frame memory 2 via a bus transmitter/receiver 4.

Numeral 5 denotes a window memory, the size of which corresponds to the frame memory 2, storing a bit pattern for specifying the validity or invalidity of picture processing executed by the processor 1. The window memory 5 is connected to a CRT controller 6 having a graphic control function, and to the processor 1.

The CRT controller 6 is a control circuit which functions to generate a synchronizing signal in order that picture data will be accepted from the video camera, to store pictures in the frame memory 2 one frame at a time, and to read a predetermined picture from the frame memory 2 to a display device (CRT), not shown. The CRT controller 6 is connected to a main bus 8 of a host CPU 7 and, in response to a command specified by the host CPU 7, functions to generate a bit pattern stored in the window memory 5 or to translate or rotate a stored bit pattern to a predetermined position.

Further, numeral 9 denotes a bus transmitter/receiver similar to the bus transmitter/receiver 4 and connected to a DMA bus 10, which is capable of performing a high-speed transfer of pixel data with the frame memory 2, and to the data bus 8.

As shown in FIG. 2, the CRT controller 6 comprises three processors controlled independently by a microprogram, namely a graphic processor 11, a display processor 12 and a timing processor 13, as well as an interface 14 on the side of the host CPU 7, and an interface 15 on the side of the CRT.

The graphic processor 11 interprets commands/parameters transferred from the host CPU 7 and performs graphic processing with respect to the window memory 5. Specifically, the graphic processor 11 is capable of successively generating graphic addresses based on a graphic generating algorithm and of performing data processing with regard to the designated pixels of the picture data. The display processor 12 controls the display address of the frame memory 2 in dependence upon the frame form displayed on the CRT. The timing processor 13 generates a CRT synchronizing signal as well as various timing signals required within the controller 6.

The interface 14 on the side of the host CPU 7 has an asynchronous bus interface control function which renders the interface connectable to a general-purpose microprocessor, to a control function for a DMA controller, and to a write-in control function. The interface 14 is capable of writing a bit pattern from the host CPU 7 into the window memory 5, and of reading out the bit pattern for the purpose of rewriting the same. The interface 15 on the CRT side is for inputting and outputting a synchronizing control signal and picture data signal with regard to the video camera and CRT, and is capable of switching between a write address and a display address in dependence upon various operating modes.

In the picture processing apparatus of the illustrated embodiment constructed as set forth above, a bit pattern specifying the validity or invalidity of processing performed by the picture processor 1 is stored in the window memory 5 in a size corresponding to the frame memory. Therefore, when the processor 1 accesses predetermined picture data in the frame memory 2 and performs picture processing for feature recognition of an object in a picture, the picture processing can be executed by the processor while it refers to the valid bits. In addition, the bit pattern limited by the pattern of the window memory can be rotated or translated by the CRT controller 6 in response to a command from the host CPU 7, so that it is possible to modify or set a pattern with ease from the CRT controller whenever necessary while it is displayed on the display device.

Thus, as described above, the picture processing apparatus of the invention stores a window pattern, which in the prior art was set in a frame memory, in the window memory the size of which corresponds to the frame memory connected to the CRT controller, and the validity or invalidity of processing is specified for every pixel of the picture data. This makes it possible to raise processing speed. In addition, a large-capacity memory for such complicated data processing as filtering processing is unnecessary. The end result is that highly efficient picture processing can be realized.

It should be noted that the picture processing apparatus of the present invention is not limited to the foregoing embodiment, and the CRT controller can be constructed in a variety of ways. Further, the setting of a window pattern may be predetermined in accordance with the features of the object to be processed in a picture. Thus, it goes without saying that various modifications can be made.

As set forth above, the picture processing apparatus of the invention is adapted in such a manner that a bit pattern for specifying the validity or invalidity of picture processing performed by a processor is stored in a window memory of a size corresponding to a frame memory, and the validity or invalidity of processing is specified for each pixel of the picture data. This makes it possible to raise processing speed. Accordingly, the invention is suited for application to a display device for displaying the state of an operation performed by an industrial robot.

What is claimed is:

1. A picture processing apparatus for processing a picture obtained from a sensor to produce data to be displayed on a display device, comprising:
    a processor for performing picture processing;
    a frame memory, coupled to the sensor and said processor, for storing a picture to be processed;
    a window memory, coupled to said processor and of a size corresponding to said frame memory, for storing, as a bit pattern, window information for specifying validity or invalidity of processing performed by said processor; and
    a control circuit, coupled to said frame memory and said window memory, for writing picture data, as converted to a digital value, into said frame memory, for generating graphic addresses based on the bit pattern stored in said window memory, for reading out of said frame memory processed data to be displayed for pixels of graphic data corresponding to valid bits, and for producing data to be displayed on said display device.

2. A picture processing apparatus according to claim 1, wherein said control circuit is coupled to a host computer which provides a command parameter, wherein said control circuit has a graphic generating algorithm for generating a predetermined graphic pattern accoridng to a command parameter provided by the host computer, wherein said window memory stores, as plural pieces of window information, bit patterns produced by translating or rotating the predetermined graphic pattern, and wherein said control circuit specifies validity or invalidity of processing performed on each picture in said frame memory by referring to window information specified by the host computer.

* * * * *